US012565200B2

(12) United States Patent
Kim

(10) Patent No.: US 12,565,200 B2
(45) Date of Patent: Mar. 3, 2026

(54) VEHICLE AND DRIVING CONTROL METHOD FOR PROVIDING GUIDE MODE ASSOCIATED WITH MISSION-BASED DRIVING TRAINING

(71) Applicants:Hyundai Motor Company, Seoul (KR); Kia Corporation, Seoul (KR)

(72) Inventor: Beom Kyu Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 309 days.

(21) Appl. No.: 17/983,865

(22) Filed: Nov. 9, 2022

(65) Prior Publication Data

US 2023/0271605 A1      Aug. 31, 2023

(30) Foreign Application Priority Data

Feb. 28, 2022      (KR) ........................ 10-2022-0026037

(51) Int. Cl.
  B60W 30/09      (2012.01)
  B60W 10/18      (2012.01)
  B60W 10/20      (2006.01)
  B60W 40/04      (2006.01)
  B60W 50/08      (2020.01)
(52) U.S. Cl.
  CPC ............ B60W 30/09 (2013.01); B60W 10/18 (2013.01); B60W 10/20 (2013.01); B60W 40/04 (2013.01); B60W 50/08 (2013.01); B60W 2420/403 (2013.01); B60W 2554/80 (2020.02)
(58) Field of Classification Search
  CPC .... B60T 2220/04; B60T 7/042; B60W 10/18;

B60W 10/184; B60W 10/20; B60W 2040/0863; B60W 2050/146; B60W 2420/403; B60W 2520/06; B60W 2540/12; B60W 2554/80; B60W 2554/802; B60W 2754/20; B60W 2754/30; B60W 30/08; B60W 30/09; B60W 30/16; B60W 30/182; B60W 40/04; B60W 40/08; B60W 50/08; B60W 50/082; B60W 50/12; B60W 50/14; G09B 19/167
  USPC .......................................................... 701/1
  See application file for complete search history.

(56) References Cited

U.S. PATENT DOCUMENTS

| | | | | |
|---|---|---|---|---|
| 10,625,676 | B1 * | 4/2020 | Tsimhoni ............. | G05D 1/0088 |
| 11,648,940 | B2 * | 5/2023 | Mizoguchi ........ | B60W 60/0051 |
| | | | | 701/23 |
| 12,043,273 | B2 * | 7/2024 | Lu ...................... | B60W 60/0053 |
| 2018/0322783 | A1 * | 11/2018 | Toyoda ................... | G06T 13/80 |
| 2019/0389441 | A1 * | 12/2019 | Yamaguchi ............ | G08G 1/166 |
| 2020/0035124 | A1 * | 1/2020 | Li ........................... | G09B 19/16 |
| 2020/0364492 | A1 * | 11/2020 | Meirov ................. | G06F 18/214 |
| 2020/0387156 | A1 * | 12/2020 | Xu ........................ | G05D 1/0212 |
| 2021/0155207 | A1 * | 5/2021 | Uehara ................... | B60T 17/22 |
| 2021/0188172 | A1 * | 6/2021 | Han ...................... | B60W 30/09 |

(Continued)

*Primary Examiner* — Andrew R Dyer
(74) *Attorney, Agent, or Firm* — Banner & Witcoff, Ltd.

(57) ABSTRACT

Disclosed is a vehicle including a plurality of sensors and a controller configured to control the sensors. If a beginner driving mode is activated by a driver, the controller may guide the driver in driving the vehicle. The controller may control the vehicle during a driving guide mode based on at least one driving condition. The at least one driving condition may include at least one of a traffic situation around the vehicle or a driving situation between the vehicle and another vehicle around the vehicle.

17 Claims, 10 Drawing Sheets

(56) References Cited

U.S. PATENT DOCUMENTS

| | | | |
|---|---|---|---|
| 2021/0403035 A1* | 12/2021 | Danna ................ | B60W 60/0011 |
| 2021/0407313 A1* | 12/2021 | Urano .............. | B60W 50/0225 |
| 2021/0407319 A1* | 12/2021 | Urano .............. | B60W 60/0059 |
| 2022/0028293 A1* | 1/2022 | Urano .................... | G06V 20/58 |
| 2022/0371625 A1* | 11/2022 | Tochioka ............. | B60W 30/09 |
| 2023/0057393 A1* | 2/2023 | Kuehnle .............. | B60W 50/14 |
| 2023/0124291 A1* | 4/2023 | Peters ................. | B60W 50/16 |
| | | | 701/22 |
| 2023/0154204 A1* | 5/2023 | Kahn .................... | G06V 20/44 |
| | | | 382/104 |
| 2023/0166743 A1* | 6/2023 | Heck ................ | B60W 30/0956 |
| 2023/0230502 A1* | 7/2023 | Moehr ................ | G09B 19/167 |
| 2024/0000354 A1* | 1/2024 | Kunieda .................. | G08G 1/00 |
| 2024/0034362 A1* | 2/2024 | Oba .................. | B60W 60/0051 |
| 2024/0208522 A1* | 6/2024 | Verma ................. | B60W 40/09 |
| 2024/0262229 A1* | 8/2024 | Iida ........................ | B60L 53/66 |
| 2024/0294115 A1* | 9/2024 | Komatsu ............. | H04N 9/8205 |

* cited by examiner

FIG. 6

ULTRASONIC SENSOR

VEHICLE SPEED

ECU
(240)

COMPLETE MODE

FIG. 7

VEHICLE AND DRIVING CONTROL METHOD FOR PROVIDING GUIDE MODE ASSOCIATED WITH MISSION-BASED DRIVING TRAINING

CROSS-REFERENCE TO RELATED APPLICATION

This application claims the benefit of Korean Patent Application No. 10-2022-0026037, filed on Feb. 28, 2022, which is hereby incorporated by reference as if fully set forth herein.

BACKGROUND

Field

The present disclosure relates to a vehicle capable of improving driving ability of a driver, and a driving control method therefor.

Discussion of the Background

Some drivers (e.g., a novice vehicle driver having recently started driving or having limited driving experience, or an inexperienced driver having poor driving skills) may be exposed to a higher risk of traffic accidents than other drivers.

In particular, due to various reasons (e.g., due to lenient requirements for obtaining a driver's license), a driver having a valid driver's license may have satisfied only minimum qualification requirements for vehicle operation and driving in many circumstances, and may lack sufficient knowledge and experience in traffic laws, lack driving common sense, and may not be aware of specific driving tips for safe driving, and thus may have a high risk of causing a traffic accident.

SUMMARY

The following summary presents a simplified summary of certain features. The summary is not an extensive overview and is not intended to identify key or critical elements.

An apparatus (e.g., the apparatus(s), devices, vehicle(s), etc. described herein) may perform a method comprising multiple operations. The apparatus may comprise: a plurality of sensors; and a controller. The controller may be configured to control the plurality of sensors. The controller may be configured to, during a driving mode associated with driver training being activated, control a movement of the vehicle according to a preset driving guide mode. The controller may be configured to control the movement based on at least one of: a traffic situation around the vehicle; or a driving situation between the vehicle and another vehicle around the vehicle.

An apparatus (e.g., the apparatus(s), devices, vehicle(s), etc. described herein) may perform a method comprising multiple operations. The method may comprise: activating, by a controller of the vehicle, a driving mode associated with driver training; and activating, during the driving mode being activated, a preset driving guide mode based on at least one of: a traffic situation around the vehicle sensed by a plurality of sensors; or a driving situation between the vehicle and another vehicle around the vehicle sensed by the plurality of sensors. The method may comprise controlling a movement of the vehicle based on the preset driving guide mode.

An apparatus (e.g., the apparatus(s), devices, vehicle(s), etc. described herein) may perform a method comprising multiple operations. The apparatus may comprise: at least one first sensor to detect one or more objects associated with the vehicle; at least one second sensor to detect a steering wheel operation of the vehicle; at least one third sensor to detect an acceleration operation of the vehicle; and a controller. The controller may be configured to, during a driving mode associated with driver training being activated: activate, based on the steering wheel operation of the vehicle satisfying a first training condition, a first driving guide mode providing a driver training indication associated with the steering wheel operation; and activate, based on the acceleration operation of the vehicle satisfying a second training condition, a second driving guide mode providing a driver training indication associated with the acceleration operation.

These and other features and advantages are described in greater detail below.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a pedal sensitivity training mission;

FIGS. 7 and 8 are diagrams illustrating a distance training mission;

DETAILED DESCRIPTION OF THE INVENTION

Figure 1:
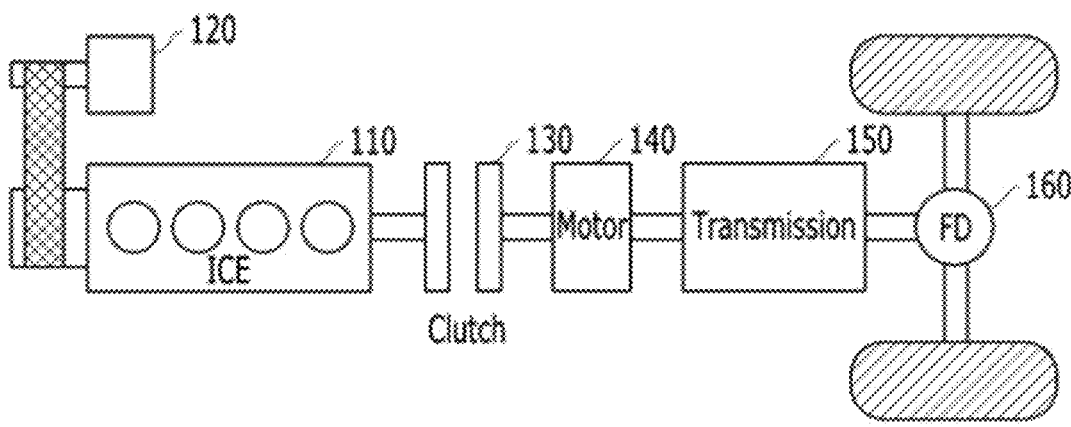
FIG. 1 illustrates an example of a configuration of a vehicle.

Reference will now be made in detail to the preferred embodiment(s) of the present disclosure, examples of which are illustrated in the accompanying drawings. Wherever possible, the same reference numbers will be used throughout the drawings to refer to the same or like parts.

Throughout the specification, when a part "includes" a certain element, this means that other elements may be further included, rather than excluding other elements, unless stated otherwise. In addition, parts indicated with the same reference numerals throughout the specification may mean the same or similar elements.

The term "unit" or "control unit" included in names such as an electronic/electrification control unit (ECU) is only a widely used term for naming a controller for controlling a specific vehicle function, and does not mean a generic functional unit. For example, each control unit may include a communication device configured to communicate with

US 12,565,200 B2

3 another control device or sensor(s) to control a function assigned thereto, a memory configured to store an operating system or logic command, input/output information, etc., and one or more processors configured to perform determination, calculation, decision, etc. necessary for controlling the function assigned thereto.

If a novice driver performs inappropriate control while driving a vehicle, a system of the vehicle may guide the driver and the vehicle operation may be adjusted (e.g., by providing correct measures and guidance on vehicle driving in real time) to guide the novice driver for safe driving.

Before describing a driving control method of a vehicle (e.g., an electric vehicle, a hybrid electric vehicle, a fuel cell electric vehicle, an electrified vehicle, etc.), a structure and a control system of a vehicle (e.g., an electrified vehicle) will be first described with reference to FIGS. 1 and 2. It is apparent to those skilled in the art that the vehicle structure described below with reference to FIGS. 1 and 2 may be similarly applied to an electric vehicle (EV) (e.g., except for a part related to an internal combustion engine).

FIG. 1 illustrates an example of a configuration of the electrified vehicle.

Referring to FIG. 1, the electrified vehicle may include a powertrain (e.g., a parallel type or transmission mounted electric drive (TMED) electrified powertrain) in which a motor 140 (e.g., an electric motor or a driving motor) and an engine clutch (EC) 130 are interposed between an internal combustion engine (ICE) 110 and a transmission 150. The electrified powertrain may include a hybrid powertrain (or any other types of powertrains).

In such a vehicle, if a driver increases the vehicle's speed (e.g., depresses an accelerator pedal after starting), the motor 140 (e.g., a driving motor) may be first driven using power of a battery not shown while the EC 130 is open, and power of the motor 140 may be transmitted through the transmission 150 and a final drive (FD) 160 to move a wheel (e.g., during an EV mode). If the vehicle is gradually accelerated and a greater driving force is required, a starter generator 120 may operate to drive the ICE 110.

If rotational speeds of the ICE 110 and the motor 140 become substantially the same (or the difference between the speeds is less than a threshold), the EC 130 may be engaged, and the ICE 110 (or both the ICE 110 and the motor 140) drive the vehicle (e.g., transition from EV mode to HEV mode). If a preset engine-off condition is satisfied (e.g., if the vehicle decelerates or begins to decelerate), the EC 130 may be opened and the ICE 110 may be stopped (e.g., transition from HEV mode to EV mode). The battery 170 may be charged by converting the driving force of the wheel into electrical energy during braking (which may be referred to as braking energy regeneration or regenerative braking), for example, in the operation of the electrified vehicle.

The starter generator 120 may serve as a starter motor (e.g., when the ICE 110 is started), and may operate as a generator (e.g., when rotational energy of the ICE 110 is recovered after the engine is started or when the engine is turned off). The starter generator 120 may be a "hybrid starter generator (HSG)," "electrified starter generator", or an "auxiliary motor."

Figure 2:
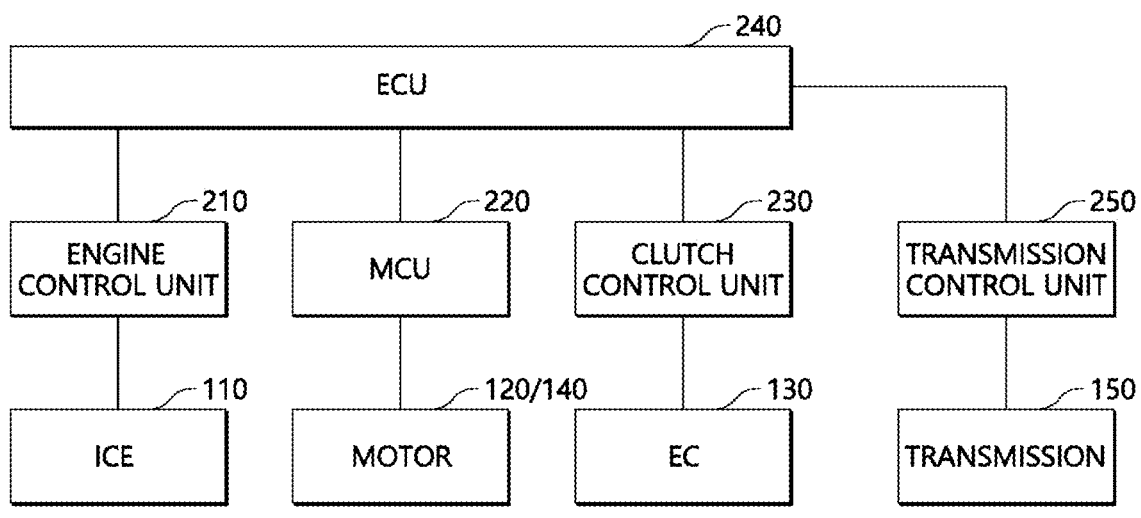
FIG. 2 is a block diagram illustrating an example of a control system of a vehicle.

FIG. 2 is a block diagram illustrating an example of a control system of a vehicle (e.g., an electrified vehicle). The control system shown in FIG. 2 may be applied to a vehicle to which the powertrain described above with reference to FIG. 1 is applied or any other vehicles.

Referring to FIG. 2, in the vehicle, the ICE 110 may be controlled by an engine controller (e.g., an engine control unit 210), torques of a motor (e.g., the starter generator 120 and the driving motor 140) may be controlled by a motor controller (e.g., a motor control unit (MCU) 220), and the EC 130 may be controlled by a clutch controller (e.g., a clutch control unit 230), respectively. The engine control unit 210 may also be referred to as an engine management system (EMS). The transmission 150 may be controlled by a transmission controller (e.g., a transmission control unit 250). In some cases, a control unit for each of the starter generator 120 and the driving motor 140 may be separately provided. The engine controller, the motor controller, the clutch controller, and/or the transmission controller may be implemented by one or more hardware components and/or software components (e.g., one or more processors and/or memory storing instructions that, when executed by the one or more processors, cause one or more control operations described herein).

Each of the controllers may be connected to an ECU 240, which may control the overall mode conversion process, as an upper-layer control unit thereof to provide the ECU 240 with information (e.g., information necessary for changing a driving mode and controlling the EC during gear shifting and/or information necessary for engine stop control under the control of the ECU 240), or perform an operation according to a control signal. The ECU 240 may be referred to as a hybrid controller unit (HCU).

The ECU 240 may perform overall powertrain control in driving the vehicle. As an example, the ECU 240 may determine the release (open) timing of the EC 130. The ECU 240 may determine a state (lock-up, slip, open, etc.) of the EC 130 and control the fuel injection stop timing of the ICE 110. For engine stop control, the ECU 240 may transmit a torque command for controlling the torque of the starter generator 120 to the MCU 220 to control engine rotational energy recovery.

If a driving mode associated with driver training (e.g., a beginner driving mode) is activated by a driver, the ECU 240 may perform each mission, and perform a control operation to guide the driver (e.g., to inform the driver and/or to control the vehicle so as not to cause a traffic accident) in performing an upgraded mission according to a performance result.

Those skilled in the art would understand that the above-described connection relationship between the control units and the function/classification of each control unit are exemplary and are not limited by terms/names thereof. For example, the ECU 240 may be implemented so that the corresponding function is provided by replacing any one of the other control units with other control units except for the ECU 240, and the corresponding function may be distributed and provided/implemented in two or more of the other control units.

Examples of the vehicle and a driving control method therefor will be described based on the above-described vehicle or vehicle structure. Those skilled in the art would understand that the above-described connection relationship between the plurality of control units and the function/classification of each control unit are exemplary and are not limited by terms/names thereof.

Figure 3:
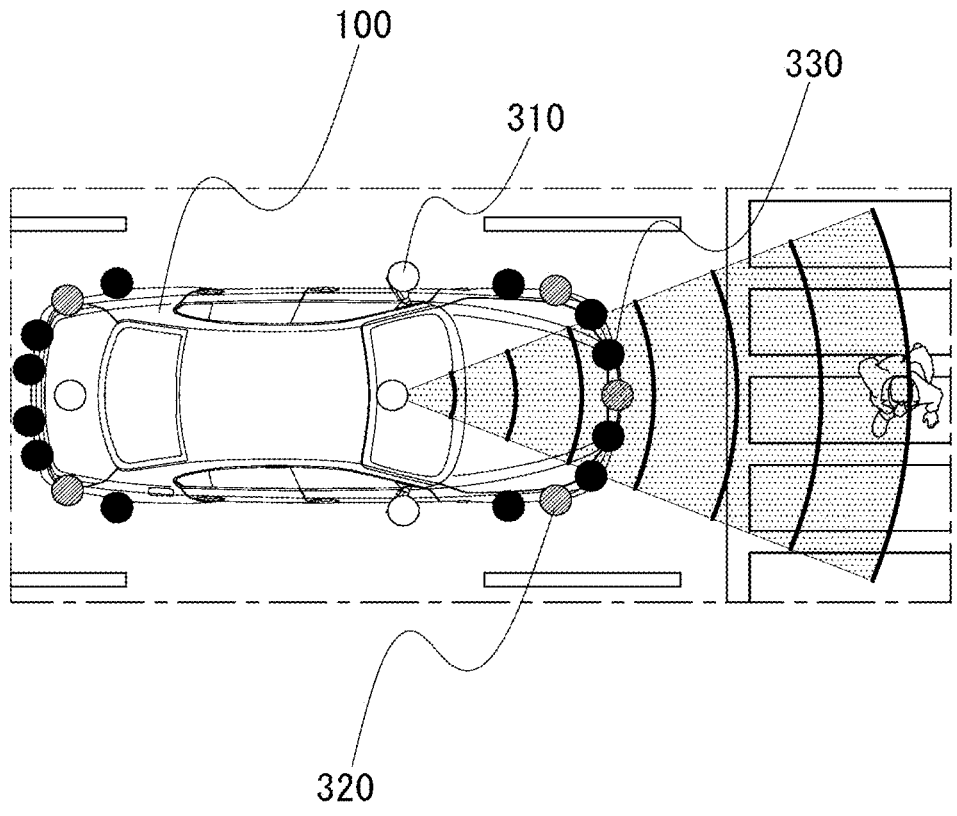
FIG. 3 is a diagram illustrating an example of a configuration of a vehicle.
Figure 4:
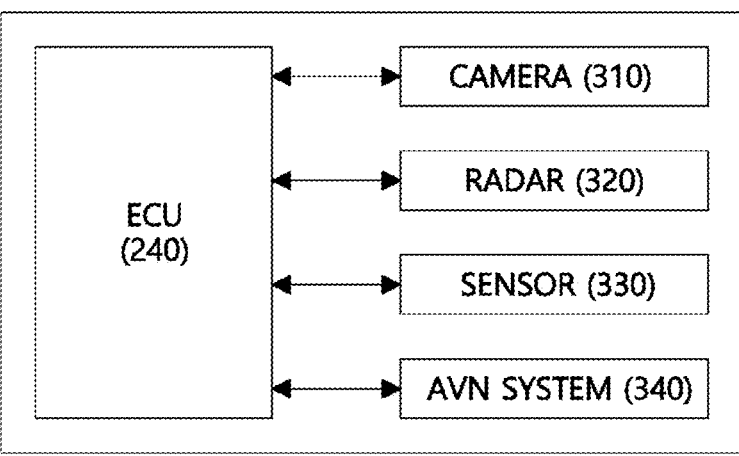
FIG. 4 is a block diagram illustrating an example of a configuration of a vehicle.

FIG. 3 is a diagram illustrating an example of a configuration of a vehicle, and FIG. 4 is a block diagram illustrating an example of a configuration of the vehicle.

Referring to FIGS. 3 and 4, the vehicle 100 (e.g., the electrified vehicle, the electric vehicle, etc.) may include a camera 310, a radar 320, a sensor 330, an audio/video/navigation (AVN) system 340, and the ECU 240.

At least one camera 310 may be disposed or installed in the vehicle 100. For example, the at least one camera 310 may include a front camera, a rear camera, and a side camera.

The front camera may be disposed forward or toward a front area, that is, in a first direction in which the vehicle 100 moves forward, to take pictures and/or video (e.g., photograph) the front area of the vehicle 100 and an area around the front area, and transmit a front image to the ECU 240. The front camera may monitor the traffic ahead to enable the vehicle to maintain a safe speed, to say in its lane, to keep its distance with vehicles ahead, and/or to react to emergency events. The front camera may detect lane markings, objects (e.g., other vehicles, pedestrians, trucks, cyclists, obstacles, etc.), various traffic signs, and/or traffic signals to guide the driver (e.g., to inform the driver and/or to control the vehicle so as not to cause a traffic accident).

The rear camera may face backward or toward a rear area, that is, in a second direction in which the vehicle 100 moves backward, to take pictures and/or video (e.g., photograph) the rear area and an area around the rear area, and transmit a rear image to the ECU 240. The second direction may be opposite to the first direction.

The side camera may be disposed on each of both sides of the vehicle 100 to take pictures and/or video (e.g., photograph) both side areas of the vehicle 100 and areas around both side areas, and transmit images of both side areas to the ECU 240. For example, the side cameras may include a left side camera and a right side camera. The left side camera may capture image(s) of a left side area of the vehicle 100 and an area around the left side area and transmit a left side image to the ECU 240, and the right side camera may capture image(s) of a right side area of the vehicle 100 and an area around the right side area and transmit a right side image to the ECU 240.

The at least one camera 310 described above may photograph objects, lanes, traffic signs, etc., including pedestrians passing around the vehicle 100.

At least one radar 320 (and/or any other sensors and/or detectors similar to radars, lidars, etc.) may be equipped or installed (e.g., in the vehicle 100). For example, the at least one radar 320 may include a front radar, a rear radar, and a side radar. The radar 320 may emit radio waves around the vehicle 100 to detect an object or a pedestrian (e.g., by detecting a reflected radio wave using a speed of the radio wave returning after colliding with the object or the pedestrian). The radio wave output from the radar 320 may have a wavelength of several cm (or any other suitable wavelength(s)).

The front radar may be disposed forward or toward a front area, that is, in the first direction in which the vehicle 100 moves forward, to emit radio waves to the front area of the vehicle 100 and an area around the front area, and transmit forward detection data detected by the emitted radio wave to the ECU 240.

The rear radar may face backward or toward a rear area, that is, in the second direction in which the vehicle 100 moves backward, to emit radio waves to the rear area of the vehicle 100 and an area around the rear area, and transmit backward detection data detected by the emitted radio wave to the ECU 240.

The side radar may be disposed on each of both sides of the vehicle 100 to emit radio waves to both side areas of the vehicle 100 and areas around both side areas, and transmit both-sides detection data detected by the emitted radio wave to the ECU 240. For example, the side radars may include a left side radar and a right side radar. The left side radar may emit radio waves to a left side area of the vehicle 100 and an area around the left side area, and transmit left side detection data detected by the emitted radio waves to the ECU 240, and the right side radar may emit radio waves to a right side area of the vehicle 100 and an area around the right side area, and transmit right side detection data detected by the emitted radio waves to the ECU 240.

The sensor 330 may include an external sensor for detecting objects located outside of the vehicle 100 and/or an internal sensor detecting objects located inside of the vehicle 100.

At least one external sensor may be equipped or installed in the vehicle 100. For example, the at least one external sensor may include a front external sensor, a rear external sensor, and a side external sensor. The external sensor may comprise an ultrasonic sensor.

For example, the ultrasonic sensor may include a transmitter and a receiver. The ultrasonic sensor may emit short, ultrasonic pulses spaced at regular intervals (e.g., using the transmitter), receive an echo signal that collides with an object and returns (e.g., using the receiver), and calculate a distance (e.g., a distance between the vehicle and the object) based on a time difference therebetween. The ultrasonic sensor may measure the presence or absence of an obstacle around the vehicle 100, a distance or speed of an object, etc.

The front external sensor may be disposed forward or toward a front area, that is, in the first direction in which the vehicle 100 moves forward, to emit an ultrasonic pulse to the front area of the vehicle 100 and an area around the front area, and transmit forward measurement data detected by the emitted ultrasonic pulse to the ECU 240.

The rear external sensor may face backward or toward a rear area, that is, in the second direction in which the vehicle 100 moves backward, to emit an ultrasonic pulse to the rear area of the vehicle 100 and an area around the rear area, and transmit backward measurement data detected by the emitted ultrasonic pulse to the ECU 240.

The side external sensor may be disposed on each of both sides of the vehicle 100 to emit ultrasonic pulses to both side areas of the vehicle 100 and areas around both side areas, and transmit both-sides measurement data detected by the emitted ultrasonic pulses to the ECU 240. For example, the side external sensor may include a left side external sensor and a right side external sensor. The left side external sensor may emit an ultrasonic pulse to a left side area of the vehicle 100 and an area around the left side area, and transmit left side measurement data detected by the emitted ultrasonic pulse to the ECU 240, and the right side external sensor may emit an ultrasonic pulse to a right side area of the vehicle 100 and an area around the right side area, and transmit right side measurement data detected by the emitted ultrasonic pulse to the ECU 240.

An object, a thing, a pedestrian, etc. around (e.g., in proximity to) the vehicle 100 may be recognized using the above-described at least one radar 320 and/or at least one external sensor.

At least one internal sensor may be equipped or installed inside the vehicle 100. For example, the at least one internal sensor may include an accelerator pedal sensor (APS) and a brake pedal sensor (BPS). The vehicle may include various electric sensors 330 capable of sensing an internal device of the vehicle 100 or a user/passenger onboard.

The APS may sense an accelerator pedal of the vehicle 100 and transmit sensed accelerator data to the ECU 240. The APS may transmit accelerator data, which may be an electrical signal according to a displacement angle, sent to the ECU 240, when the accelerator pedal of the vehicle 100 is depressed.

The BPS may sense a brake pedal of the vehicle 100 and transmit sensed brake data to the ECU 240. The BPS may transmit brake data, which may be an electrical signal according to a displacement angle, sent to the ECU 240, when the brake pedal of the vehicle 100 is depressed.

The ECU 240 may analyze various vehicle data input to the at least one camera 310, radar 320, and/or sensor 330 described above, and perform a control operation to pre-emptively brake the BPS, for example, upon determining that braking of the driver is slow as a result of analysis. A detailed description thereof will be provided later.

The AVN system 340 may receive various vehicle data (e.g., under the control of the ECU 240), and display or show information about a current location or a road condition/type corresponding to a road ahead within a certain distance, a speed limit, etc. based on the data. For example, the AVN system 340 may include an indoor voice system (e.g., a convenience system that assists in reporting a road condition and safe driving through voice), and/or a navigation-based smart cruise control (NSCC) system (e.g., a driving convenience system that recognizes road information using navigation and assists in driving at a safe speed on a highway). The AVN system 340, the indoor voice system, and/or the NSCC system described above may be arranged as one module (e.g., a hardware component) or as individual modules (e.g., a plurality of hardware components).

Each of the AVN system 340, the indoor voice system, and the NSCC system may guide the driver (e.g., a novice driver) so that the driver may safely drive under the control of the ECU 240.

The AVN system 340 may operate so that a driver input or a user input is selected through a command input interface provided in the vehicle 100, for example, a dial, a key button, a touch button, a touch screen, etc. The AVN system 340 may be operated by transmitting the driver input or the user input via a telematics center through manipulation of an application installed in a smart device of the user.

The ECU 240 may be disposed/equipped in the vehicle 100 and electrically connected to the camera 310, the radar 320, the sensor 330, the AVN system 340, etc. to receive and analyze various vehicle data received therefrom, and control the vehicle 100 based on an analyzed result value.

For example, if a driving mode associated with driver training (e.g., a driving guide mode, a novice driving mode) is activated by the driver, the ECU 240 may perform a control operation to guide the driver in driving the vehicle, for example, in response to a preset driving guide mode based on at least one of: a traffic situation around the vehicle; or a driving situation between the vehicle and another vehicle around the vehicle.

A detailed description of an operation of the ECU 240 will be provided later with reference to the drawings.

Figure 5:
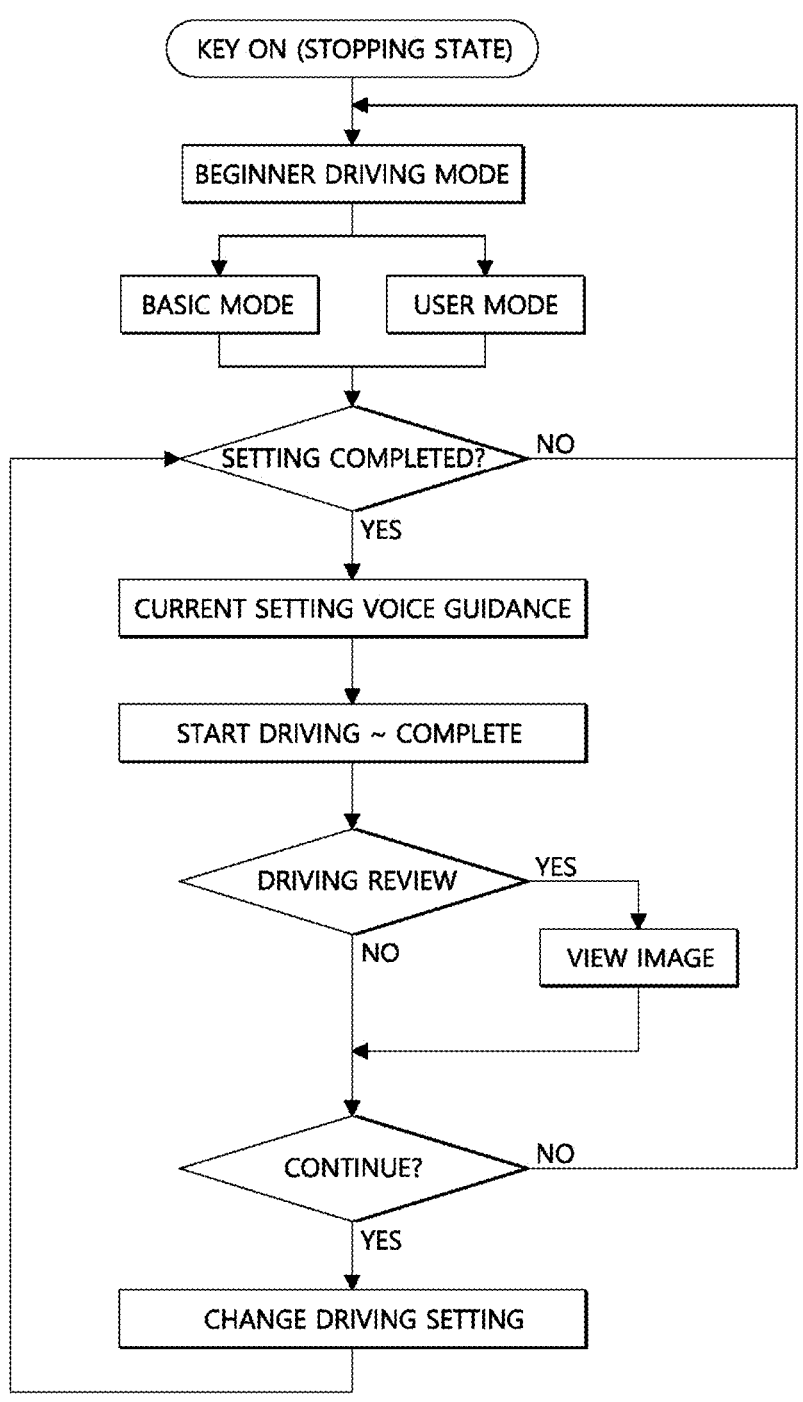
FIG. 5 is a flowchart illustrating a driving control method of a controller for controlling a vehicle.

FIG. 5 is a flowchart illustrating a driving control method of a controller for controlling a vehicle.

Referring to FIG. 5, the controller (e.g., an ECU) may control the vehicle using the following driving control method.

If the user (e.g., the novice driver) of the vehicle selects the driving mode associated with driver training through the AVN system, the ECU may enter the driving mode and/or activate the driving mode.

The ECU may analyze various vehicle data obtained from at least one camera, at least one radar, and/or at least one sensor, and may determine whether to activate the driving mode based on an analyzed result.

For example, upon determining that the number of operations of the brake pedal sensed through a plurality of sensors at a distance between the vehicle and another vehicle exceeds a threshold (e.g., a preset reference number of times) in a state in which the driving mode associated with driver training is not activated, the ECU may activate the driving mode associated with driver training.

For example, if the cumulative number of times of braking exceeds the threshold (e.g., the preset reference number of times) at a distance of 7 m to 50 m to another vehicle in front of the vehicle 100, the ECU may activate the driving mode. The reference number of times may be 5 times (or any other number). The reference number of times may be changed, for example, in consideration of the road condition (e.g., based on a quantized value associated with a road condition), etc.

The ECU may guide the driver in driving the vehicle, for example, during the operation of a preset driving guide mode, based on at least one of: a traffic situation around the vehicle; or a driving situation between the vehicle and another vehicle around the vehicle. The driving guide mode may include at least one mission having different driving conditions.

The driving guide mode may include a basic mode and a user mode.

The basic mode may include at least one mission. The basic mode may be a mode in which the driver can proceed to a next mission if the driving skill of each mission among a plurality of missions is completed under the control of the ECU. The basic mode may be a mode in which each mission is sequentially performed according to the assessed driving skill of the driver.

The user mode may include one or more missions, and may be a mode in which a mission selected by the driver is performed. During the operation of the user mode, one or more missions may not be sequentially progressed, and may be progressed or experienced based on a selected mission.

The one or more missions may include a plurality of missions (e.g., a first mission, a second mission, and a third mission, etc.). Respective missions may be expressed as a first mission to a third mission. The first mission may be a pedal sensitivity training mission, the second mission may be a distance training mission, and the third mission may be a lane change training mission. The missions may be changed according to the skill level of the driver, and upon determining that a mission can improve driving skill, the mission may be added.

The pedal sensitivity training mission, which may be the first mission, may assist/guide the driver in learning pedal sensitivity (e.g., through using the accelerator pedal and/or the brake pedal). The AVN system may display information about pedal sensitivity to the driver and/or convey the information to the driver through other output devices (e.g., a speaker) under the control of the ECU, thereby supporting improvement of the driving skill of the driver.

The distance training mission, which may be the second mission, may assist/guide the driver in learning how to sense and/or maintain a proper distance (e.g., a distance between the vehicle in motion and another vehicle running next to the vehicle, or a distance remaining before entering an intersection, a crosswalk, etc.).

The distance training mission may include a forward diagonal distance learning mission and a straight forward distance learning mission. If all of the missions for the distance training mission are successful regardless of the order, it may be determined that the driving skill associated with distance has been completed or learned. The AVN system may display information about distance to the driver or send/convey the information to the driver through the output device (e.g., a speaker) under the control of the ECU, thereby supporting improvement of driving skill of the driver.

The lane change training mission, which may be the third mission, may assist/guide the driver in learning an operation of the side mirror and an operation of a turn signal for lane changes. The AVN system may display information about pedal sensitivity to the driver or send/convey the information to the driver through the output device (e.g., a speaker) under the control of the ECU, thereby supporting improvement of driving skill of the driver.

If one of the basic mode or the user mode is set, the ECU may start driving the vehicle based on the set mode and guide the driver (e.g., until the vehicle arrives at a set destination). The AVN system may assist/guide the driver in the currently set mode under the control of the ECU, and assist, guide, and/or support the driver in an event occurring during driving and driving skills corresponding to the event (e.g., until the vehicle arrives at the destination).

The AVN system may record driving images based on the various vehicle data, for example, based on the driving mode being set under the control of the ECU, and may provide a driving review to the driver based on the recorded images (e.g., during or after arriving at the destination).

For example, upon arriving at the destination, the ECU may display the driving review in the AVN system (e.g., by a selection of the driver). The driving review may include the entire recorded images or a part of the recorded images.

For example, the ECU may extract an event image from among the recorded images and perform a control operation to display the driving review (e.g., in the AVN system based on the extracted event image). The event image may include an image of a direct intervention by the ECU due to a driving mistake of the driver during driving the vehicle, an image of an inadequate vehicle control by the driver in an inexperienced manner during driving the vehicle, an image of an improper vehicle control by the driver during driving the vehicle, etc.

The ECU may maintain the current mode or reset the driving mode (e.g., a driver training mode, the beginner driving mode) to a mode other than the current mode by selection of the driver.

Figure 6:
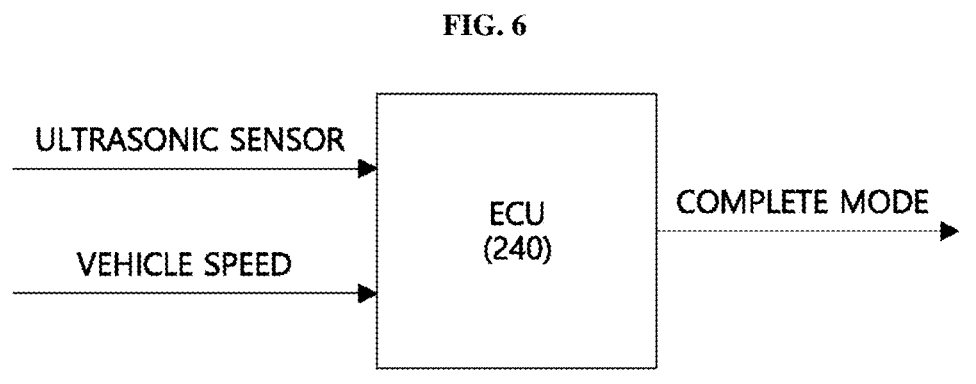

FIG. 6 is a diagram illustrating the pedal sensitivity training mission.

Referring to FIG. 6, the ECU may assist/guide a driver in learning pedal sensitivity by controlling the accelerator pedal and/or the brake pedal.

In the pedal sensitivity training mission, an example of a brake pedal training mission is as follows.

If a maximum vehicle speed is a first speed (e.g., 10 kph, 10 mph), and there are no other vehicles within a threshold distance (e.g., a measurement distance as a result of analyzing distance measurement data (e.g., voltage measurement data indicating a distance between the vehicle and another vehicle) provided from the front external sensor, the ECU may control the brake pedal to guide the driver in learning the pedal sensitivity. The brake pedal may be a brake that can be controlled by a foot (e.g., a foot brake).

The AVN system may display information about the pedal sensitivity to the driver or send/convey the information to the driver through an output device (e.g., the speaker) under the control of the ECU, thereby supporting improvement of driving skill of the driver.

For example, the AVN system may display the operation of the brake pedal to assist/guide the driver so that the driver may easily follow the operation or the system may notify the driver of an appropriate force of depressing the brake pedal (e.g., through the speaker). For example, the AVN system may output a message saying "depress the brake pedal harder" or "slowly depress the brake pedal" through the speaker to support improvement of the driving skill.

The learning of the driving skill may be performed through the following brake mission. However, aspects of the present disclosure are not limited thereto, and it may be possible to include various other types of training missions (e.g., for different drivers).

The brake mission may include a first brake mission and a second brake mission.

The first brake mission may include a quick stop mission by rapidly depressing the brake pedal. A pass condition of the first brake mission may include a condition that the brake pedal is rapidly depressed within 0.5 second each time to change the vehicle speed from 10 kph to 0 kph, and may be satisfied if two or more of three attempts are successful.

The second brake mission may include a smooth stop mission by gradually depressing the brake pedal. A pass condition of the second brake mission may include a condition that the brake pedal is gradually depressed for 1 second or more each time to change the vehicle speed from 10 kph to 0 kph, and may be satisfied if two or more of three attempts are successful.

The ECU may notify the driver of description (e.g., mission guidelines) of the brake mission (e.g., through the AVN system by voice or image) before performing the first brake mission or the second brake mission described above. It may be possible to notify the driver by voice or image of a precaution against a situation that may occur when the vehicle brakes abruptly.

The ECU may report that vibration may be generated while the brake pedal is depressed, for example, if a steering wheel provides a haptic function.

If an improper vehicle operation by the driver is detected or if it is determined that a forward collision is expected based on an analyzed result of vehicle sensing data, the ECU may assign a priority to an automatic braking control of the vehicle over the driving skill training, thereby performing a control operation to preemptively operate the brake pedal. For example, if an improper vehicle operation by the driver is detected while guiding the driver in driving the vehicle, the ECU may perform a control operation to guide the driver so that the vehicle gradually slows down or to force the vehicle to stop based on a traffic situation or a driving situation.

In the pedal sensitivity training mission, an example of an accelerator pedal training mission is as follows.

The ECU may guide the driver in learning the pedal sensitivity while gradually increasing the vehicle speed. The ECU may analyze sensing results of the various vehicle sensors to perform a control operation to gradually increase a vehicle speed change range (e.g., from a first accelerator mission to a third accelerator mission).

The first accelerator mission may be performed in a first vehicle speed change range (e.g., a speed range of 0 to 15 kph). A pass condition of the first accelerator mission may be satisfied if a maximum speed of a first speed (e.g., 15 kph) is maintained for a first duration (e.g., 3 seconds) in the first accelerator mission. If the pass condition of the first accelerator mission is satisfied, the ECU may perform a control operation to proceed to the second accelerator mission, which may be the next mission.

The second accelerator mission may be performed in a second vehicle speed change range (e.g., a speed range of 0 to 30 kph). A pass condition of the second accelerator mission may be satisfied if a maximum speed of a second speed (e.g., 30 kph) is maintained for a second duration (e.g., 3 seconds) in the second accelerator mission. If the pass condition of the second accelerator mission is satisfied, the ECU may perform a control operation to proceed to the third accelerator mission, which may be the next mission.

The third accelerator mission may be executed in a third vehicle speed change range (e.g., a speed range of 0 to 50 kph). A pass condition of the third accelerator mission may be satisfied if a maximum speed of a third speed (e.g., 50 kph) is maintained for a third duration (e.g., 1 second) for a quantity of times (e.g., 5 times) in the third accelerator mission. If the pass condition of the third accelerator mission is satisfied, the ECU may determine that the driving skill training for learning pedal sensitivity has been completed.

In a process of the accelerator pedal training, if a distance between the vehicle and another vehicle in front of the vehicle is within a threshold distance (e.g., a risky distance of 10 m or 5 m, or the distance is within 1 m), the ECU may perform a control operation to slow down the vehicle by controlling the brake system. The ECU may assist/guide the driver in advance with voice for the controlled braking operation through the AVN system.

Figure 7:
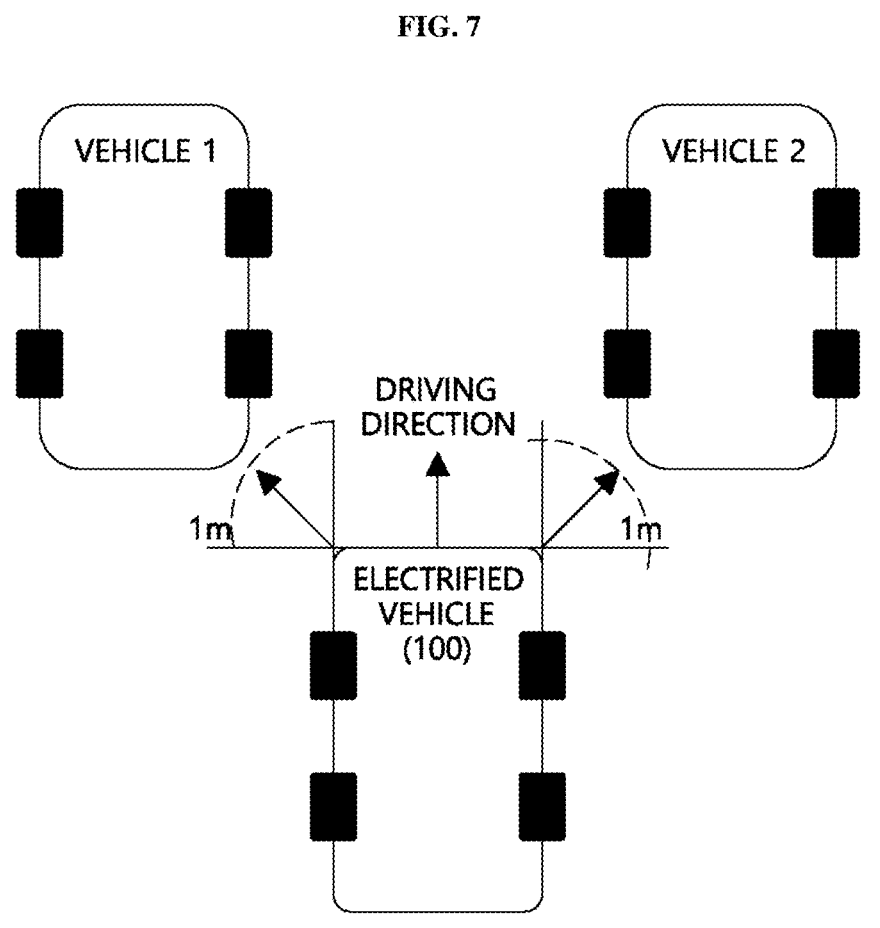
Figure 8:
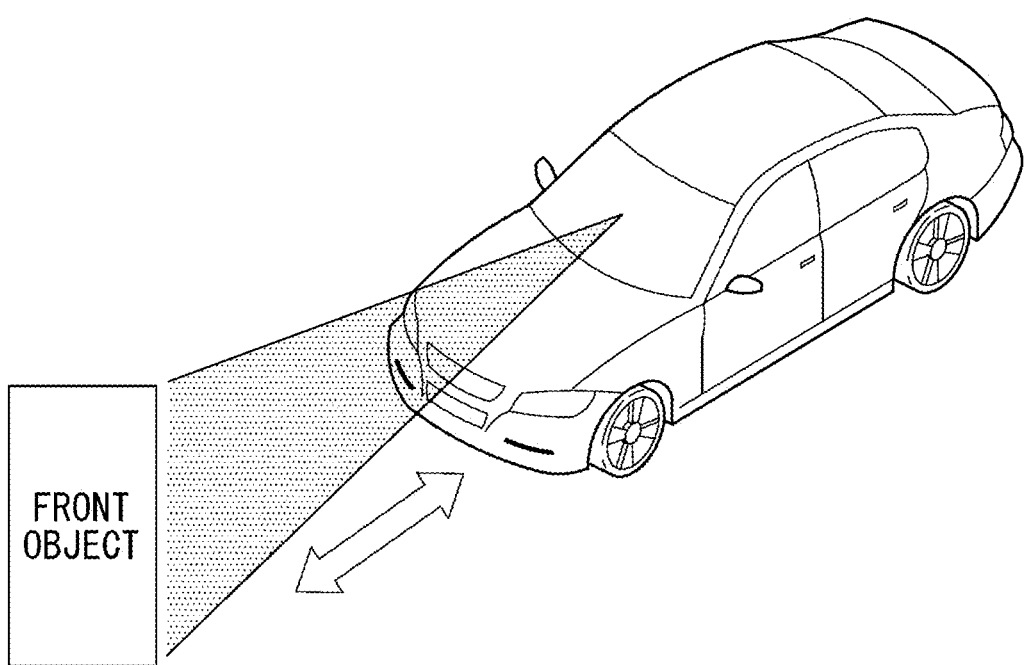

FIGS. 7 and 8 are diagrams illustrating a distance training mission.

Referring to FIGS. 7 and 8, the ECU may assist/guide the driver in learning how to maintain a proper distance between vehicles (e.g., a sense of distance for a distance between the vehicle in motion and another vehicle running next to the vehicle, or a distance remaining before entering an intersection, a crosswalk, etc.).

The distance training mission may include a forward diagonal distance training mission and/or a straight forward distance training mission.

Referring to FIG. 7, an example of the forward diagonal distance training mission is as follows.

The forward diagonal distance training mission may be performed within a first vehicle speed (e.g., a vehicle speed range of 0 to 30 kph) under control of the ECU, and may be performed if at least one activation condition is satisfied. The ECU may receive and analyze the various vehicle sensor data, and determine whether the activation condition is satisfied based on an analyzed result.

The activation condition may be satisfied, for example, if another vehicle is detected in a diagonal direction (e.g., based on forward detection data detected by the front radar and/or backward detection data detected by the rear radar while recognizing lane markings in a forward image photographed by the front camera).

If the activation condition is satisfied, the ECU may (e.g., visually and/or audibly) output a message indicating that a front diagonal direction distance training mission is started/entered through the AVN system.

A pass condition of the forward diagonal distance training mission may be satisfied, for example, if forward detection data detected by the front radar and/or backward detection data detected by the rear radar are analyzed, and a diagonal distance between the vehicle and another vehicle maintains a threshold distance (e.g., 0.6 m or more) for a threshold duration (e.g., 3 seconds or more) as a result of analysis.

In a process of the forward diagonal distance training mission, if a diagonal distance between the vehicle and a front vehicle is less than a second threshold distance (e.g., 30 cm), the ECU may perform a control operation to control the vehicle to increase the distance between the vehicle and the other vehicle (e.g., controlling the brake system to slow down the vehicle). The ECU may assist/guide the driver in advance with a notification (e.g., sound, voice, message, etc.) for the automatic vehicle control intervention by the AVN system.

Referring to FIG. 8, an example of the straight forward distance training mission is as follows.

In the straight forward distance training mission, sensed data of the various vehicle sensors may be provided and analyzed under control of the ECU, and a braking time and the amount of deceleration of the vehicle may be monitored based on an analyzed result.

For example, the braking time $\Delta T$ may be expressed by the following Equation 1.

$$\Delta T = Tf - Ts \qquad \text{[Equation 1]}$$

Tf may denote a time when the brake pedal is depressed, Ts may denote a sensor signal recognition time when a first distance between the vehicle and another vehicle is sensed (e.g., a front object is located 5 m ahead), and $\Delta T$ may denote a time difference between Tf and Ts. Here, a sensor signal may be received and the braking monitoring time may be calculated through the forward direction data, the forward measurement data, etc.

For example, the vehicle speed deceleration amount $\Delta\alpha$ may be expressed by the following Equation 2.

$$\Delta\alpha = (V_{end} - V_{start})/(T_{end} - T_{start}) \qquad \text{[Equation 2]}$$

$V_{end}$ may denote an end vehicle speed of a second sampling time, $V_{start}$ may denote a starting vehicle speed of a first sampling time, and $\Delta\alpha$ may denote acceleration. The sampling may be at intervals of a threshold time duration (e.g., 0.1 second) from the time when the brake pedal is depressed.

The ECU may determine the skill level of the driver in at least one step based on the value $\Delta T$ extracted by monitoring the braking time and the value $\Delta\alpha$ extracted by monitoring the amount of deceleration of the vehicle.

For example, the ECU may set a first driving skill mission for the case of a condition of $\Delta T >$ vehicle speed/10, set a second driving skill mission for the case where $\Delta T >$ vehicle speed/10 and $\Delta\alpha$ is constant, and set a third driving skill mission for the case where $\Delta T >$ vehicle speed/12 and $\Delta\alpha$ is constant.

During the operation of the first driving skill mission, if a distance between the vehicle and a front object is a first threshold distance (e.g., 50 m or less, or a distance between the vehicle and a vehicle in front is 50 m or less), the ECU may assist/guide the driver with a warning message (e.g., every one second) through the AVN system. During the operation of the second driving skill mission, if a distance between the vehicle and a front object is a second threshold distance (e.g., 50 m or less, or a distance between the vehicle and a vehicle in front is 50 m or less), the ECU may assist/guide the driver with a warning message (e.g., every two seconds) through the AVN system. During the operation of the third driving skill mission, if a distance between the vehicle and a front object is a third threshold distance (e.g., 10 m or less, or a distance between the vehicle and a vehicle in front is 10 m or less), the ECU may assist/guide the driver with a warning message (e.g., once) through the AVN system.

In a process of the straight forward distance training mission, if a distance between the vehicle and a vehicle in front (or a front object) satisfies a threshold distance (e.g., 5 m or less), and the vehicle speed satisfies a threshold speed (e.g., 40 kph or more), the ECU may perform a control operation to slow down the vehicle (e.g., by controlling the brake system to brake). The ECU may assist/guide the driver in advance with a notification (e.g., sound, voice, etc.) for the automatic vehicle control intervention through the AVN system.

As described above, if the conditions for the forward diagonal direction distance training mission and/or the straight forward direction distance training mission are satisfied, the ECU may determine that learning of the driving skill for the distance learning mission has been completed.

Figure 9:
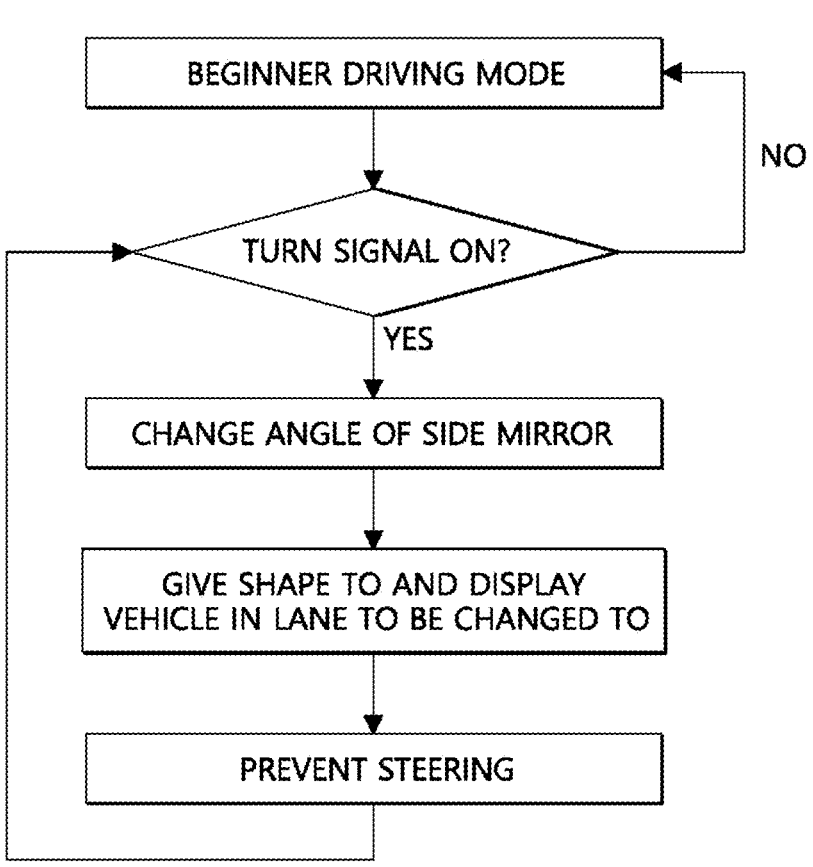
FIG. 9 is a diagram illustrating a lane change training mission.
Figure 10:
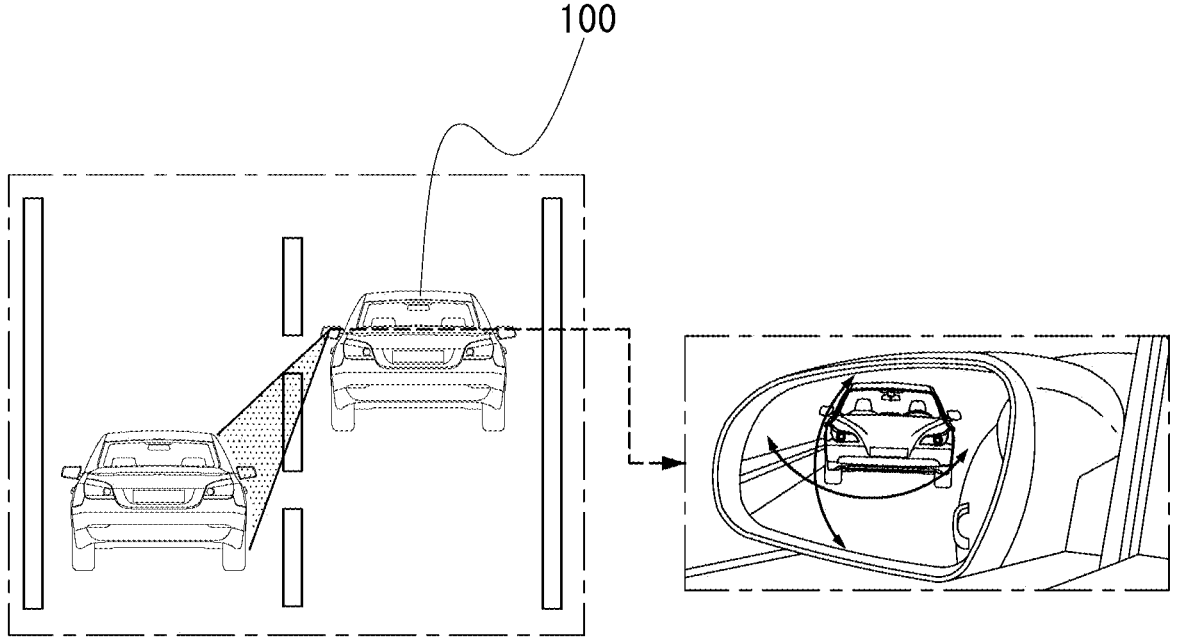
FIG. 10 is a diagram illustrating an operation of a side mirror.

FIG. 9 is a diagram illustrating a lane change training mission. FIG. 10 is a diagram illustrating an operation of a side mirror.

Referring to FIG. 9, when changing lanes and/or if a turn signal is in operation, the ECU may assist/guide the driver in learning an operation of a side mirror, and operations of a turn signal and an emergency light.

If the driving mode associated with driver training (e.g., the beginner driving mode) is activated, the ECU may sense the operation of the turn signal.

If the operation of the turn signal is sensed, the ECU may perform a control operation to adjust an angle of the side mirror disposed in the same direction as that of the turned-on turn signal. For example, if a right turn signal is activated and operated, the ECU may perform a control operation to adjust an angle of the right side mirror. In this instance, the angle of the side mirror may be adjusted (e.g., between −10 degrees and −5 degrees) based on a value set (e.g., a value set before or when the vehicle starts to operate).

If the angle of the side mirror is adjusted, the ECU may analyze various vehicle data, visualize a vehicle driven in a lane to be changed to (e.g., based on an analyzed result), and display the vehicle on the AVN system.

The ECU may analyze various vehicle data, and if a rear-end collision or a collision with a vehicle driven in a lane to be changed to is expected based on an analyzed result, the ECU may perform a control operation so that the steering is locked. Accordingly, it may be possible to reduce or prevent a rear-end collision or a collision with a vehicle driven in a neighboring lane while the vehicle makes a lane change.

As described above, the vehicle and the driving control method therefor may improve the driving ability of the driver by performing at least one mission while the driving mode associated with driver training is activated, and performing an upgraded mission according to a performance result.

The vehicle and the driving control method therefor may safely protect the driver by activating vehicle control intervention (e.g., assisted braking operations) to prevent accidents due to inexperienced driving or improper maneuvers in a process of performing a mission.

The vehicle and the driving control method therefor configured as described above may have advantages of improving the driving ability of the driver by performing at least one mission while the driving mode is activated, and performing an upgraded mission according to a performance result.

The vehicle and the driving control method therefor may have advantages of safely protecting the driver by activating vehicle control intervention (e.g., assisted braking operations) to prevent accidents due to inexperienced driving or improper maneuvers in a process of performing a mission.

The vehicle and the driving control method therefor may improve the driving skill of the driver by operating assisted braking operations to prevent accidents due to inexperienced driving or improper maneuvers in a process of performing a mission to safely protect the driver.

The effects and/or advantages are not limited to the above-mentioned effects and/or advantages, and other effects and/or advantages not mentioned herein may be clearly understood by those of ordinary skill in the art.

The features described above may be implemented as computer-readable code on a medium in which a program is recorded. The computer-readable medium includes all types of recording devices in which data readable by a computer system is stored. Examples of the computer-readable medium include a hard disk drive (HDD), a solid-state drive (SSD), a silicon disk drive (SDD), a ROM, a RAM, a CD-ROM, a magnetic tape, a floppy disk, an optical data storage device, etc.

Aspects of the present disclosure are directed to a vehicle and a driving control method therefor that may substantially obviate one or more problems due to limitations and disadvantages of the related art.

A vehicle may be capable of improving driving ability of a novice driver by guiding the novice driver in performance of each mission and performance of an upgraded mission according to a performance result while a beginner driving mode is activated.

Additional advantages, objects, and features of the disclosure are set forth in part in the description and in part will become apparent to those having ordinary skill in the art upon examination of the following or may be learned from practice of the invention. The objectives and other advantages may be realized and attained by the structure particularly pointed out in the written description and claims hereof as well as the appended drawings.

To achieve these objects and other advantages, as embodied and broadly described herein, a vehicle may include a plurality of sensors, and an electrification control unit (ECU) configured to control the sensors, in which, when a beginner driving mode is activated by a driver, the ECU may guide the driver in driving the vehicle in response to a preset driving guide mode based on at least one of a traffic situation around the vehicle or a driving situation between the vehicle and another vehicle around the vehicle.

A driving control method for a vehicle may include a plurality of sensors and an ECU. The method may include activating a beginner driving mode, responding to a preset driving guide mode based on at least one of a traffic situation around the vehicle or a driving situation between the vehicle and another vehicle around the vehicle while the beginner driving mode is activated, and guiding a driver in driving the vehicle based on the preset driving guide mode.

An apparatus (e.g., the apparatus(s), device(s), vehicle(s), etc. described herein) may perform a method comprising multiple operations. The apparatus may comprise: a plurality of sensors; and a controller. The controller may be configured to: control the plurality of sensors; and during a driving mode associated with driver training being activated, control a movement of the vehicle according to a preset driving guide mode. The controller may be configured to control the movement based on at least one of: a traffic situation around the vehicle; or a driving situation between the vehicle and another vehicle around the vehicle. The controller may be configured to control the movement of the vehicle based on a distance between the other vehicle and the vehicle. The controller may be configured to control the movement of the vehicle by performing, based on detection of an improper maneuver by a driver of the vehicle, a control operation to slow down the vehicle or to control a brake system of the vehicle. Based on a number of operations of a brake pedal sensed through the plurality of sensors at a distance between the vehicle and the other vehicle exceeding a preset reference number of times in a state in which the driving mode is not activated, the controller may activate the driving mode. The preset driving guide mode may comprise a plurality of missions associated with different driving conditions. The driving guide mode may comprise at least one of: a basic mode in which, if at least one mission of the plurality of missions is completed, the controller is configured to start a subsequent mission, and a user mode in which a mission of the plurality of missions is selected by a driver of the vehicle. Based on the driving mode is activated, the controller may perform a control operation to record driving images associated with the vehicle, and generate a driving review result based on the recorded driving images. The controller may perform a control operation to extract an event image from the recorded driving images and generate the driving review result based on the extracted event image. Based on a determination to control the brake system of the vehicle, the controller may output a message indicating a brake control intervention. The controller may be configured to analyze the traffic situation or the driving situation, and if a rear-end collision or a collision between the vehicle and the other vehicle is expected based on an analyzed result, the controller may be configured to intervene by adjusting a steering wheel operation. The apparatus may also perform one or more additional operations (e.g., one or more operations described herein). The apparatus may comprise one or more processors; and memory storing instructions that, when executed by the one or more processors, cause the apparatus to perform the described method, additional operations and/or include the additional elements. A system (e.g., a vehicle) may comprise the apparatus configured to perform the described method, additional operations and/or include the additional elements; and another device components described herein. A computer-readable medium may store instructions that, when executed, cause performance of the described method, additional operations and/or include the additional elements.

An apparatus (e.g., the apparatus(s), device(s), vehicle(s), etc. described herein) may perform a method comprising multiple operations. The apparatus may comprise: at least one first sensor to detect one or more objects associated with the vehicle; at least one second sensor to detect a steering wheel operation of the vehicle; at least one third sensor to detect an acceleration operation of the vehicle; and a controller. The controller may be configured to, during a driving mode associated with driver training being activated: activate, based on the steering wheel operation of the vehicle satisfying a first training condition, a first driving guide mode providing a driver training indication associated with the steering wheel operation; and activate, based on the acceleration operation of the vehicle satisfying a second training condition, a second driving guide mode providing a driver training indication associated with the acceleration operation. The apparatus may comprise at least one fourth sensor to control at least one side mirror of the vehicle. The controller may be configured to, during the driving mode associated with driver training being activated, adjust, based on a lane change operation of the vehicle satisfying a third training condition, an angle of the at least one side mirror of the vehicle. The controller may be configured to perform, during the first driving guide mode and based on the at least one first sensor and the at least one second sensor, at least one of: outputting of steering wheel operation analytics; or controlling of a steering wheel operation. The controller may be configured to perform, during the second driving guide mode and based on the at least one first sensor and the at least one third sensor, at least one of: outputting of acceleration operation analytics; or controlling of an acceleration operation. The apparatus may also perform one or more additional operations (e.g., one or more operations described herein). The apparatus may comprise one or more processors; and memory storing instructions that, when executed by the one or more processors, cause the apparatus to perform the described method, additional operations and/or include the additional elements. A system (e.g., a vehicle) may comprise the apparatus configured to perform the described method, additional operations and/or include the additional elements; and another device components described herein. A computer-readable medium may store instructions that, when executed, cause performance of the described method, additional operations and/or include the additional elements.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A driving control method performed by an apparatus of a vehicle, the driving control method comprising:

activating, by a controller of the vehicle, a driving mode associated with driver training;

activating, during the driving mode being activated, a preset driving guide mode based on at least one of:

a traffic situation around the vehicle sensed by a plurality of sensors; or a driving situation between the vehicle and another vehicle around the vehicle sensed by the plurality of sensors; and controlling a movement of the vehicle based on the preset driving guide mode, wherein the preset driving guide mode comprises a plurality of missions associated with different driving conditions, and wherein the preset driving guide mode comprises: a basic mode in which, based on at least one prerequisite mission of the plurality of missions being completed, a subsequent mission is started by the controller, and a user mode in which a mission of the plurality of missions is selected by a driver of the vehicle, wherein the plurality of missions comprises one or more of: a pedal sensitivity training mission, a distance training mission, or a lane change training mission, wherein the distance training mission comprises one or more of a forward diagonal distance learning mission or a straight forward distance learning mission, and wherein the method further comprises:

determining a lane change operation of the vehicle satisfies a third training condition;

adjusting, by the controller and during the driving mode being activated, an angle of at least one side mirror of the vehicle based on the lane change operation of the vehicle satisfying the third training condition;

activating a first driving guide mode and collecting sensing data from at least one sensor configured to detect a steering wheel operation;

performing, during the first driving guide mode and based on the sensing data from the at least one sensor configured to detect a steering wheel operation, at least one of:

outputting steering wheel operation analytics; or
controlling a steering wheel operation; and
activating a second driving guide mode and collecting
sensing data from at least one sensor configured to
detect an acceleration operation;
performing, during the second driving guide mode and
based on the sensing data from the at least one sensor
configured to detect an acceleration operation, at
least one of:
outputting acceleration operation analytics; or
controlling an acceleration operation.

2. The driving control method according to claim 1,
wherein the controlling the movement of the vehicle com-
prises controlling the movement of the vehicle based on a
distance between the other vehicle and the vehicle.

3. The driving control method according to claim 1,
wherein the controlling the movement of the vehicle com-
prises controlling the movement of the vehicle, based on
detection of an improper maneuver by a driver of the
vehicle, by slowing down the vehicle or controlling a brake
system of the vehicle.

4. The driving control method according to claim 1,
wherein the driving mode is activated based on a number of
operations of a brake pedal sensed through the plurality of
sensors at a distance between the vehicle and the other
vehicle exceeding a preset reference number of times in a
state in which the driving mode is not activated.

5. The driving control method according to claim 1,
further comprising:
recording driving images associated with the vehicle
while the driving mode is activated; and
generating a driving review result based on the recorded
driving images.

6. The driving control method according to claim 5,
further comprising extracting an event image from the
recorded driving images, wherein the driving review result
is generated based on the extracted event image.

7. The driving control method according to claim 1,
wherein the controlling the movement of the vehicle com-
prises controlling, by the controller, the movement of the
vehicle by controlling a brake system of the vehicle, and
wherein, based on a determination to control the brake
system of the vehicle, outputting a message indicating a
brake control intervention.

8. The driving control method according to claim 1,
further comprising:
analyzing the traffic situation or the driving situation;
based on the analyzing, determining that a rear-end col-
lision or a collision between the vehicle and the other
vehicle is expected; and
intervening, by the controller, by adjusting a steering
wheel operation based on the determination that a
rear-end collision or a collision between the vehicle and
the other vehicle is expected.

9. A vehicle comprising:
at least one first sensor to detect one or more objects
associated with the vehicle;
at least one second sensor to detect a steering wheel
operation of the vehicle;
at least one third sensor to detect an acceleration operation
of the vehicle;
at least one fourth sensor to control at least one side mirror
of the vehicle; and a controller configured to:
based on a plurality of prerequisite missions being
completed during a driving mode associated with
driver training being activated, activating at least one
subsequent mission;
based on the at least one subsequent mission being
activated:
activate, based on the steering wheel operation of the
vehicle satisfying a first training condition, a first
driving guide mode providing a driver training
indication associated with the steering wheel
operation; and
activate, based on the acceleration operation of the
vehicle satisfying a second training condition, a
second driving guide mode providing a driver
training indication associated with the accelera-
tion operation;
adjust, during the driving mode being activated, an
angle of the at least one side mirror of the vehicle
based on a lane change operation of the vehicle
satisfying a third training condition;
perform, during the first driving guide mode and based
on the at least one first sensor and the at least one
second sensor, at least one of:
outputting steering wheel operation analytics; or
controlling a steering wheel operation; and
perform, during the second driving guide mode and
based on the at least one first sensor and the at least
one third sensor, at least one of:
outputting acceleration operation analytics; or
controlling an acceleration operation.

10. A vehicle comprising:
a plurality of sensors; and
a controller configured to:
control the plurality of sensors; and
during a driving mode associated with driver training
being activated, control a movement of the vehicle
according to a preset driving guide mode, wherein
the controller is configured to control the movement
based on at least one of:
a traffic situation around the vehicle; or
a driving situation between the vehicle and another
vehicle around the vehicle,
wherein the preset driving guide mode comprises a
plurality of missions associated with different
driving conditions, and
wherein the preset driving guide mode comprises: a
basic mode in which, based on at least one pre-
requisite mission of the plurality of missions being
completed, the controller is configured to start a
subsequent mission, and a user mode in which a
mission of the plurality of missions is selected by
a driver of the vehicle,
wherein the plurality of missions comprises one or
more of: a pedal sensitivity training mission, a
distance training mission, or a lane change train-
ing mission, and
wherein the distance training mission comprises one
or more of a forward diagonal distance learning
mission or a straight forward distance learning
mission,
wherein the controller is further configured to:
adjust, during the driving mode being activated, an
angle of at least one side mirror of the vehicle based
on a lane change operation of the vehicle satisfying
a third training condition;

perform, during a first driving guide mode and based on sensing data from at least one of the plurality of sensors configured to detect a steering wheel operation, at least one of:

outputting steering wheel operation analytics; or controlling a steering wheel operation; and perform, during a second driving guide mode and based on sensing data from at least one of the plurality of sensors configured to detect an acceleration operation, at least one of:

outputting acceleration operation analytics; or controlling an acceleration operation.

11. The vehicle according to claim 10, wherein the controller is configured to control the movement of the vehicle based on a distance between the other vehicle and the vehicle.

12. The vehicle according to claim 10, wherein the controller is configured to control the movement of the vehicle by performing, based on detection of an improper maneuver by a driver of the vehicle, a control operation to slow down the vehicle or to control a brake system of the vehicle.

13. The vehicle according to claim 12, wherein, based on a determination to control the brake system of the vehicle, the controller is configured to output a message indicating a brake control intervention.

14. The vehicle according to claim 10, wherein, based on a number of operations of a brake pedal sensed through the plurality of sensors at a distance between the vehicle and the other vehicle exceeding a preset reference number of times in a state in which the driving mode is not activated, the controller is configured to activate the driving mode.

15. The vehicle according to claim 10, wherein, based on the driving mode being activated, the controller is configured to perform a control operation to record driving images, associated with the vehicle, and generate a driving review result based on the recorded driving images.

16. The vehicle according to claim 15, wherein the controller is configured to perform a control operation to extract an event image from the recorded driving images and generate the driving review result based on the extracted event image.

17. The vehicle according to claim 10, wherein, the controller is configured to analyze the traffic situation or the driving situation, and based on a rear-end collision or a collision between the vehicle and the other vehicle being expected, the controller is configured to intervene by adjusting a steering wheel operation.

* * * * *